United States Patent
Ramos et al.

(10) Patent No.: US 10,611,954 B2
(45) Date of Patent: Apr. 7, 2020

(54) POLYAMIDE RESINS FOR COATING OF SAND OR CERAMIC PROPPANTS USED IN HYDRAULIC FRACTURING

(71) Applicant: Lawter, Inc., Chicago, IL (US)

(72) Inventors: Eva Ramos, Chicago, IL (US); John Schneider, Chicago, IL (US)

(73) Assignee: LAWTER INC., Chicago, IL (US)

( * ) Notice: Subject to any disclaimer, the term of this patent is extended or adjusted under 35 U.S.C. 154(b) by 0 days.

(21) Appl. No.: 15/541,577

(22) PCT Filed: Jan. 5, 2016

(86) PCT No.: PCT/US2016/012187
§ 371 (c)(1),
(2) Date: Jul. 5, 2017

(87) PCT Pub. No.: WO2016/112013
PCT Pub. Date: Jul. 14, 2016

(65) Prior Publication Data
US 2018/0265771 A1    Sep. 20, 2018

Related U.S. Application Data

(60) Provisional application No. 62/100,343, filed on Jan. 6, 2015.

(51) Int. Cl.
| | | |
|---|---|---|
| C09K 8/80 | (2006.01) | |
| C09K 8/68 | (2006.01) | |
| C09D 177/08 | (2006.01) | |
| C08G 73/10 | (2006.01) | |
| E21B 43/267 | (2006.01) | |
| C09K 8/66 | (2006.01) | |

(52) U.S. Cl.
CPC .......... *C09K 8/805* (2013.01); *C08G 73/1003* (2013.01); *C09D 177/08* (2013.01); *C09K 8/665* (2013.01); *C09K 8/68* (2013.01); *C09K 8/685* (2013.01); *E21B 43/267* (2013.01); *C09K 2208/08* (2013.01)

(58) Field of Classification Search
None
See application file for complete search history.

(56) References Cited

U.S. PATENT DOCUMENTS

| | | |
|---|---|---|
| 4,064,940 A | 12/1977 | Sparlin |
| 4,069,184 A | 1/1978 | Ferraro et al. |
| 4,075,369 A | 2/1978 | Ferraro et al. |
| 4,098,843 A | 7/1978 | Johnson |
| 4,255,267 A | 3/1981 | Hoehn et al. |
| 4,351,916 A | 9/1982 | Kohan |
| 4,365,041 A | 12/1982 | Okamoto et al. |
| 4,421,892 A | 12/1983 | Kasahara et al. |
| 4,472,338 A | 9/1984 | Hermann et al. |
| 4,664,670 A | 5/1987 | Mehl et al. |

(Continued)

OTHER PUBLICATIONS

International Search Report & Written Opinion in International Application No. PCT/US2016/012187, dated Jul. 14, 2016 (13 pages).

*Primary Examiner* — Jeffrey D Washville
(74) *Attorney, Agent, or Firm* — Foley & Lardner LLP (57) ABSTRACT

A proppant includes coating of a polyamide resin. The proppants may be used in subterranean well formations and hydraulic fracturing operations.

22 Claims, 3 Drawing Sheets

(56) References Cited

U.S. PATENT DOCUMENTS

| | | | |
|---|---|---|---|
| 4,666,995 | A | 5/1987 | Auerbach et al. |
| 4,734,439 | A | 3/1988 | Reischl |
| 4,767,420 | A | 8/1988 | Mehl et al. |
| 4,801,621 | A | 1/1989 | Reischl |
| 4,853,421 | A | 8/1989 | Hayes |
| 4,855,052 | A | 8/1989 | Reischl |
| 4,875,900 | A | 10/1989 | Singh et al. |
| 4,886,844 | A | 12/1989 | Hayes |
| 4,900,443 | A | 2/1990 | Wrasidlo |
| 4,900,771 | A | 2/1990 | Gerace et al. |
| 5,025,043 | A | 6/1991 | Smith |
| 5,034,499 | A | 7/1991 | Yang et al. |
| 5,039,768 | A | 8/1991 | Gerace et al. |
| 5,095,058 | A | 3/1992 | Smith et al. |
| 5,109,054 | A | 4/1992 | Smith |
| 5,143,650 | A | 9/1992 | Gerace et al. |
| 5,160,628 | A | 11/1992 | Gerace et al. |
| 5,223,106 | A | 6/1993 | Gerace et al. |
| 5,254,263 | A | 10/1993 | Gerace et al. |
| 5,292,789 | A | 3/1994 | Ishida et al. |
| 5,321,087 | A | 6/1994 | Ogata et al. |
| 5,407,985 | A | 4/1995 | Smith |
| 5,428,083 | A | 6/1995 | Smith et al. |
| 5,478,888 | A | 12/1995 | Ogata et al. |
| 5,539,025 | A | 7/1996 | Smith et al. |
| 5,548,017 | A | 8/1996 | Distefano |
| 5,605,944 | A | 2/1997 | Heebner |
| 5,710,199 | A | 1/1998 | Hubert et al. |
| 5,723,538 | A | 3/1998 | Fischer et al. |
| 5,770,680 | A | 6/1998 | Fischer et al. |
| 5,804,682 | A | 9/1998 | Fischer et al. |
| 5,853,048 | A | 12/1998 | Weaver et al. |
| 5,854,372 | A | 12/1998 | Henze et al. |
| 5,863,979 | A | 1/1999 | Ahmed |
| 5,886,135 | A | 3/1999 | Fischer et al. |
| 5,897,929 | A | 4/1999 | Li et al. |
| 5,939,184 | A | 8/1999 | Inoue et al. |
| 5,945,186 | A | 8/1999 | Li et al. |
| 5,948,880 | A | 9/1999 | Fischer et al. |
| 5,994,494 | A | 11/1999 | Wakui |
| 6,077,900 | A | 6/2000 | Boudreaux et al. |
| 6,099,682 | A | 8/2000 | Krampe et al. |
| 6,111,055 | A | 8/2000 | Berger et al. |
| 6,143,481 | A | 11/2000 | Uytterhoeven et al. |
| 6,177,365 | B1 | 1/2001 | Li |
| 6,177,366 | B1 | 1/2001 | Li |
| 6,242,509 | B1 | 6/2001 | Berger et al. |
| 6,290,801 | B1 | 9/2001 | Krampe et al. |
| 6,399,155 | B2 | 6/2002 | Child et al. |
| 6,436,499 | B1 | 8/2002 | Krampe et al. |
| 6,439,309 | B1 * | 8/2002 | Matherly ............... C08G 69/48 166/276 |
| 6,444,594 | B1 | 9/2002 | Child et al. |
| 6,458,412 | B2 | 10/2002 | Child et al. |
| RE37,951 | E | 12/2002 | Hubert et al. |
| 6,576,574 | B2 | 6/2003 | Child et al. |
| 6,878,787 | B2 | 4/2005 | Rauscher et al. |
| 6,881,810 | B2 | 4/2005 | Matsunami |
| 6,911,169 | B2 | 6/2005 | Kwag et al. |
| 7,309,678 | B2 | 12/2007 | Rauscher et al. |
| 7,338,986 | B2 | 3/2008 | Ananthachar et al. |
| 7,501,359 | B2 | 3/2009 | Li et al. |
| 8,048,815 | B2 | 11/2011 | Kubota et al. |
| 8,314,174 | B2 | 11/2012 | Callander et al. |
| 8,377,337 | B2 | 2/2013 | Bastiaens et al. |
| 8,436,080 | B2 | 5/2013 | Elliott et al. |
| 8,465,818 | B2 | 6/2013 | Heater et al. |
| 2005/0059558 | A1 | 3/2005 | Blauch et al. |
| 2007/0031663 | A1 | 2/2007 | Honda et al. |
| 2007/0079965 | A1 * | 4/2007 | Nguyen ................ C09K 8/68 166/279 |
| 2007/0088133 | A1 | 4/2007 | Heater |
| 2007/0246214 | A1 * | 10/2007 | Fish, Jr. .................. C09K 8/80 166/280.2 |
| 2008/0132674 | A1 | 6/2008 | Kong et al. |
| 2008/0167418 | A1 | 7/2008 | Kong et al. |
| 2008/0194772 | A1 | 8/2008 | Kong et al. |
| 2008/0275182 | A1 | 11/2008 | Kong et al. |
| 2009/0221734 | A1 | 9/2009 | Kuwahara et al. |
| 2011/0030949 | A1 | 2/2011 | Weaver et al. |
| 2012/0064138 | A1 | 3/2012 | Beveridge et al. |
| 2012/0148753 | A1 | 6/2012 | Kubota et al. |
| 2012/0298734 | A1 | 11/2012 | Bradshaw et al. |
| 2013/0112409 | A1 * | 5/2013 | Baleno ..................... C09K 8/80 166/278 |
| 2013/0154201 | A1 | 6/2013 | Kethorn et al. |
| 2013/0161003 | A1 | 6/2013 | Makarychev-Mikhailov et al. |
| 2013/0219800 | A1 | 8/2013 | Guiselin |
| 2013/0256323 | A1 | 10/2013 | Knudsen et al. |
| 2013/0295810 | A1 | 11/2013 | Matsui et al. |
| 2014/0008018 | A1 | 1/2014 | Di Martino |

\* cited by examiner

POLYAMIDE RESINS FOR COATING OF SAND OR CERAMIC PROPPANTS USED IN HYDRAULIC FRACTURING

CROSS-REFERENCE TO RELATED APPLICATIONS

This application is a U.S. National Phase Application under 35 U.S.C. § 371 of International Application No. PCT/US2016/012187, filed on Jan. 5, 2016, which claims the benefit of priority to U.S. Provisional Patent Application No. 62/100,343, filed on Jan. 6, 2015. The entire contents of each are incorporated herein by reference.

BACKGROUND

Hydraulic fracturing is a technique commonly used to break open subterranean shale and rock formations to enhance the ease of extracting materials, most often oil and natural gas, from such formations. In this technique, water is mixed with sand and chemicals, and the mixture ("fracking fluid," or "fracturing fluid") is injected at high pressure into a wellbore to create small fractures.

A hydraulic fracture is formed by pumping the fracturing fluid into the wellbore at a rate sufficient to increase pressure downhole at the target zone to crack the surrounding rock. Once cracked, the fracture fluid continues further into the rock, extending the fracture. In order to maintain "fracture width" open, or slow its decline, a material that includes a solid particle having sufficiently high crush strength, such as grains of sand, ceramic, or other particulates is introduced into the injected fluid. This material is referred to as a "proppant," and it prevents the fractures from closing when the injection is stopped and the pressure of the fluid removed.

Once the cracks or fractures are opened in the well section, the fracking fluid rushes in to fill them. It is the proppant that actually holds these fractures open or at least impedes the process of the cracks closing up after the fluid pressure is removed.

Proppants are designed to hold open the cracks in a formation for the life of the well, which is often from 5 to 45 years. Types of proppants include silica sand, resin-coated sand, ceramics and bauxite, among others. The most commonly used proppant is silica sand, though proppants of uniform size and shape, such as a ceramic proppants, may also be employed. Proppant pack may be permeable to oil or gas under high pressures, the interstitial space between particles of proppants may be sufficiently large and have the mechanical strength to withstand closure stresses and hold fractures open. The proppant is spherical, or nearly spherical to maximize the voids between particles, thereby allowing for a maximum flow of oil and gas past the proppant into the main portion of the well. The measure of how easily fluids can pass through a formation or through a proppant is known as its "conductivity."

Untreated sand, when used as a proppant, is prone to generation of significant fines (i.e. finely ground sand) and flow-back of the proppant, especially under higher formation stresses. Synthetic resin coatings can be employed to provide particle-to-particle bond in order to minimize or eliminate flowback and to reduce the fine formation. Different synthetic resins can be used in proppant coatings including phenol resins, epoxy resins, polyurethane resins, furane resins, polyurea resins, etc. With some coatings, the synthetic resin is not completely cured until the coated proppant is placed into the well. The coated, partially cured proppant is free-flowing but it is still capable of providing particle-to-particle bond at the temperature and pressure encountered downhole. There are a number of performance issues associated to the use of partially cured proppants including storage stability, premature bonding and the need of an activator for lower temperature wells.

It would be desirable to provide a proppant coated with a synthetic resin that is a free flowing product and presents high crush resistance, minimum flowback, good conductivity and a bond strength significantly higher than commercially available alternatives without the need of an activator, when used for hydraulic fracturing operations in low temperature wells.

SUMMARY

In one aspect, the technology is directed to polyamide resin based proppants. The proppants may include a particle and a coating including a polyamide resin ("resin coating"). The particle in the proppant may be any solid particle of adequate size that present sufficiently high crush resistance. Suitable examples include, but are not limited to, a sand, a naturally occurring mineral fiber, a ceramic, a bauxite, a glass, a metal bead, a walnut hull, other nut shells, or a composite particle. In certain embodiments, the particle is a porous ceramic or porous polymer particle. In some embodiments, the particle has a mesh size from about 8 to about 140, based on the U.S. Standard Sieve Series.

The polyamide resin is the product of a condensation reaction of a dicarboxylic acid and a diamine. The polyamide resin can also include multifunctional monomers. In some embodiments, the dicarboxylic acid included in the polyamide resin is a dimer fatty acid. A dimer fatty acid is also referred to as "polymerized fatty acid." In some embodiments, the dicarboxylic acid may be, but is not limited to, glutaric acid, maleic acid, itaconic acid, succinic acid, adipic acid, pimelic acid, glutamic acid, suberic acid, sebacic acid, or dimerized rosin. In some embodiments, the dicarboxylic acid is an aromatic or cyclic aliphatic (alicyclic) acid. For example, the dicarboxylic acid may be, but is not limited to, an aromatic or cyclic aliphatic (alicyclic) carboxylic acid, which is 1,4-cyclohexane dicarboxylic acid, phthalic acid, isophthalic acid, terephthalic acid, or diphenic acid (biphenyl-2,2-dicarboxylic acid). In other embodiments, the dicarboxylic acid may be in the form of a carboxylic acid precursor. For example, a carboxylic acid precursor may include, but is not limited to, acyl halide, ester, and anhydrides such as dimethyl 1,4-cyclohexanedicarboxylate, dimethyl terephthalate, succinic anhydride, trimellitic anhydride, phthalic anhydride, or pyromellitic anhydride. A precursor compound is one that can be converted to the dicarboxylic acid by, for example, hydrolysis. In some embodiments, the polyamide resin includes a monomer that has three or more carboxylic acid functional groups, also referred to as multifunctional monomers. Multifunctional monomers may be employed to increase the cross-linking degree to improve the mechanical and chemical resistance of the coating. For example, a multifunctional carboxylic acid precursor may include, but is not limited to, trimer fatty acid, citric acid, tricarballylic acid, trimesic acid, trimellitic acid, benzene-1,2,3-tricarboxylic acid, 1-methylbutane-1,2,4-tricarboxylic acid, propane-1,2,3-tricarboxylic acid, ethylenetetracarboxylic acid, 1,2,4,5 benzenetetracarboxylic acid, 1,2,3,4,-butanetetracarboxylic acid, oligomers and polymers with multiple carboxylic acid functionality. In some embodiments, the multifunctional carboxylic acid precursor is the rosin-dienophile adduct of a rosin selected from the group consisting of tall oil rosin, wood rosin and gum rosin and a dienophile selected from the group consisting of fumaric acid, maleic acid, maleic acid anhydride, citraconic acid, itaconic acid. In some embodiments, the polyamide resin includes a monocarboxylic acid. Without being bound by theory, it is hypothesized that monocarboxylic acid acts as a "chain stopper" during the polymerization process. A combination of any two or more monocarboxylic and dicarboxylic acids, monocarboxylic and dicarboxylic acid precursors, or monomers with three or more carboxylic acid functionalities may also be used.

The polyamide resin coating of the proppant may include a diamine, triamine, or tetraamine. In some embodiments, the diamine is ethylene diamine, hexamethylenediamine, 1,3-diaminopropane, 1,4-diaminobutane, propylene diamine, or amine terminated glycols. In some embodiments, the diamine employed in the polyamide synthesis may be a cyclic amine or the amine might include a cyclic or aromatic moiety, such as piperazine, 1-methyl-2,6-cyclohexyldiamine, 4,4'-dicyclohexylmethane diamine, m-xylenediamine or isophoronediamine. In some embodiments, the triamine included in the polyamide resin is diethylenetriamine or amino ethyl piperazine. In other embodiments, the tetramine included in the polyamide resin is triethylenetetraamine. A combination of any two or more of any of the diamines, triamines, or tetraamines may be used.

In another aspect, the technology is directed to a fracking fluid including a coated proppant, which may include a particle and a coating containing a polyamide resin. The fracking fluid may further include one or more additives such as, but not limited to, corrosion inhibitors or scale inhibitors, wetting agents, surfactants or a combination of any two or more thereof. In some embodiments, the fracking fluid further includes a tackifying agent. In some embodiments, the fracking fluid does not include a tackifying agent.

In one aspect, the technology is directed to a method of preparing a coated proppant, including contacting the proppant with a composition including a polyamide resin. In some embodiments, the proppant and the composition including the polyamide resin are heated to a temperature above the melting point of the resin to coat the proppant with the resin, and form a hot-coated proppant. In some embodiments, the hot-coated proppant is then cooled to a temperature below the melting point of the resin. In some embodiments, the method of preparing a coated proppant results in a free-flowing, non-tacky coated proppant.

In some embodiments, the method of preparing a coated proppant includes contacting the proppant with a composition including a polyamide resin in a solvent. In some embodiments, the solvent may include, but is not limited to, saturated and unsaturated alcohols having 1-24 carbon atoms, ether alcohols having 5-36 carbon atoms, hydrocarbons having 5-50 carbon atoms, ethers and carboxylic acid esters having 10-60 carbon atoms. Illustrative of these are (without limitation) methanol, ethanol, isopropyl alcohol, 1-butanol, 2-butanol, cyclohexanol, 1-hexanol, 2-hexanol, cis-2-hexen-1-ol, α-terpineol, terpene hydrocarbon, toluene, xylene, methyl lactate, ethyl lactate, n-propyl lactate, isopropyl lactate, diethylene glycol methyl ether, dipropylene glycol methyl ether, cyclohexanone, or mixtures thereof. In some embodiments, the composition also includes one or more additives.

In some embodiments, the method of preparing a coated proppant includes contacting the proppant with a composition including a polyamide resin in an emulsion or dispersion.

Illustrative additives may include, but are not limited to, silane coupling agents, plasticizers, fillers, viscosity modifiers, top coatings, anticaking agents, tackifying agents, or a combination of any two or more thereof. In some embodiments, the composition does not include a tackifying agent.

In some embodiments, the coated proppant is further treated with a curing agent that includes an acrylic functional group. In some embodiments, the coated proppant is further treated with a tackifying agent.

In one aspect, the proppant is treated with a coupling agent prior to its treatment with the composition including the polyamide resin. Without being limited by theory, it is hypothesized that the coupling agent helps bond the resin coating to the proppant surface. In some embodiments, the coupling agent is a silane coupling agent. Examples of silane coupling agents include, but are not limited to, acrylate and methacrylate functional silanes such as (3-acryloxypropyl) trimethoxysilane, methacryloxypropyl trimethoxysilane, methacryloxymethyl trimethoxysilane, (3-acryloxypropyl) methyldimethoxysilane, methacryloxypropyl dimethylethoxysilane, aldehyde functional silanes such as triethoxysilylundecanal, triethoxsilylbutyraldehyde, epoxy functional silanes such as 2-(3,4-epoxycyclohexyl) ethyltriethoxysilane, 2-(3,4-epoxycyclohexyl) ethyltrimethoxysilane, (3-glycidoxypropyl)triethoxy silane, (3-glycidoxypropyl)methyldiethoxysilane, (3-glycidoxypropyl) dimethylethoxysilane, ester functional silanes such as acetoxymethyl triethoxysilane, acetoxymethyl trimethoxysilane, acetoxypropyl trimethoxysilane, 10-(carbomethoxy) decyldimethyl-methoxysilane, isocyanate functional silanes such as 3-isocyanato propyltriethoxysilane, 3-isocyanatopropyltrimethoxysilane, triethoxysilylpropylethylcarbamate, 3-thiocyanatopropyl triethoxysilane.

In certain embodiments, the coating of the present invention can be applied as an outer layer over a previously coated proppant. The previously coated proppant may include a coating of, but are not limited to, phenolic resins, polyurethane resins, epoxy resins, polyurea resins. Without being limited by theory, it is hypothesized that the outer layer enhances the bonding ability of the underlying coating.

The coated proppant needs to exhibit adequate crush resistance and conductivity as well as provide a strong particle-to-particle bond in order to avoid flowback and fines migration. In turn, the coated proppant should be non-tacky and free-flowing after sand coating and during transport and storage. Moreover, the coating is flexible and non-brittle, reducing transport and handling problems associated to the formation of dust. At elevated temperatures and pressures often encountered in subterranean formations, the coated proppants exhibit latent tackiness leading to the agglomeration of the coated proppants when placed on the formation without the need of an activator. In turn, high bond strength is developed in fairly a short period of time, as fast as 4 hours. The network of agglomerated proppant prevents particle flow-back and reduces fines migration. Flow back in the well causes damage to well operator pumps and other equipment and must be prevented. Fines migration must be minimized in order to maximize oil flow through the proppant pack.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

The present technology is directed to proppant coatings that include a polyamide resin. The coated proppants of the present technology enhance the performance characteristics of the proppant, for example, increase the crush resistance and compressive strength of the proppant, reduce fines formation of the proppant, reduce flow-back of the proppant, and generally provide for better conductivity of the proppant, when compared to current proppants. The polyamide resins used in the present technology have more advantageous physical and chemical properties, such as strength and toughness, over the rosin derivatives typically used as proppant coating materials. Moreover, the polyamide resin coated proppants of the present technology avoid the use of harmful raw materials such as phenol and isocyanates, preventing the associated health and environmental concerns. Further, the polyamide resin coated proppants of the present technology are better able to withstand the exposure to the extracted oil and natural gas compared to other proppant coating resins. In addition, the polyamide resin coating is associated with less frequent cleanouts of the coating equipment, leading to an overall cost reduction in the production process.

In one aspect, the technology is directed to proppants that may include a particle and a coating including a polyamide resin. The polyamide resin may include the polymerization product of a dicarboxylic acid and a diamine. The polyamide resin may also include multifunctional monomers. In some embodiments, the dicarboxylic acid in the polyamide resin coating of the proppant is a dimer fatty acid. For example, a dimer fatty acid-based polyamide resin may have a composition including 35 to 49.5 mole % of dimerized fatty acid, 0.5 to 15 mole % of monomeric $C_{12-22}$ fatty acid, and 2 to 35 mole % of a polyether diamine. Alternatively, a dimer fatty acid-based polyamide resin may have a composition including 20 to 49.5 mole % of dimerized fatty acid, 0.5 to 15 mole % of monomeric $C_{12-22}$ fatty acid, and 20 to 55 mole % of a $C_{2-40}$ amine containing at least two primary amino groups. The dimer fatty acids in the resin composition may be partly replaced by aliphatic or aromatic dicarboxylic acids, or dimerized rosin acids, containing 12 to 40 carbon atoms. Other examples of dicarboxylic acids in the polyamide resin include, but are not limited to, aliphatic dicarboxylic acids. Suitable aliphatic dicarboxylic acids can contain 4 to 40 carbon atoms. For example, glutaric acid, maleic acid, itaconic acid, succinic acid, adipic acid, pimelic acid, glutamic acid, suberic acid and even sebacic acid are suitable. In some embodiments, the dicarboxylic acid is an aromatic or cyclic aliphatic (alicyclic) acid, such as 1,4-cyclohexane dicarboxylic acid, phthalic acid, isophthalic acid, terephthalic acid, or diphenic acid (biphenyl-2,2-dicarboxylic acid). In other embodiments, the dicarboxylic acids are derived from carboxylic acid precursors such as, acyl halide, ester, and anhydrides, for example, dimethyl 1,4-cyclohexanedicarboxylate, dimethyl terephthalate, succinic anhydride, trimellitic anhydride, phthalic anhydride, or pyromellitic anhydride. In some embodiments, the polyamide resin includes a monomer that includes three or more carboxylic acid functional groups. Multifunctional monomers can be employed to increase the cross-linking degree to help improve the mechanical and chemical resistance of the coating. For example, a multifunctional carboxylic acid precursor may include, but is not limited to, trimer fatty acid, citric acid, tricarballylic acid, trimesic acid, trimellitic acid, benzene-1,2,3-tricarboxylic acid, 1-methylbutane-1,2,4-tricarboxylic acid, propane-1,2,3-tricarboxylic acid, ethylenetetracarboxylic acid, 1,2,4,5 benzenetetracarboxylic acid, 1,2,3,4,-butanetetracarboxylic acid, oligomers and polymers with multiple carboxylic acid functionality. In some embodiments, the multifunctional carboxylic acid precursor is the resin-dienophile adduct of a rosin selected from the group consisting of tall oil rosin, wood rosin and gum rosin and a dienophile selected from the group consisting of fumaric acid, maleic acid, maleic acid anhydride, citraconic acid, itaconic acid. In some embodiments, the polyamide resin includes a monocarboxylic acid. Without being bound by theory, it is hypothesized that monocarboxylic acid acts as a "chain stopper" during the polymerization process. A combination of any two or more monocarboxylic and dicarboxylic acids, monocarboxylic and dicarboxylic acid precursors, or monomers with three or more carboxylic acid functionality may also be used.

The polyamide resins used to coat the proppants may include a diamine, triamine or tetraamine component. The diamine, triamine or tetraamine component may include two, three, or four primary, secondary, or tertiary amino groups in the compound. In some embodiments, the diamine is one or more linear $C_{2-10}$ alkylene diamines, for example ethylene diamine, hexamethylenediamine, 1,3-diaminopropane, 1,4-diaminobutane, propylene diamine, or amine terminated glygols. In some embodiments, the diamine polyamide may be a cyclic amine or the amine might include a cyclic or aromatic moiety, such as piperazine, 1-methyl-2,6-cyclohexyldiamine, 4,4'-dicyclohexylmethane diamine, m-xylenediamine. In some embodiments, the amine is a multifunctional amine, for example, diethylenetriamine, amino ethyl piperazine, triethylenetetramine, or mixtures thereof.

The polyamide resins for use in proppant coating exhibit a glass transition temperature (Tg) that enhances crush resistance and provides sufficient conductivity. In some embodiments, the Tg of the proppant coating is at a temperature that is lower than the temperature encountered downhole so that the thermoplastic coating has the ability to soften under prevailing combination of temperature and pressure. In some aspects, the Tg of the polyamide resin is in the range that promotes high bond strength at the expected operating temperature where the proppant will be employed. The polyamide resin for proppant coating exhibits a melting point that enables its use as a proppant coating. In some embodiments, the melting temperature is a temperature that is less than that employed during the coating procedure. The melting point of the polyamide resin is higher than that prevailing downhole. In some embodiments, the polyamide resin may include unreacted functionalities that can further react on the well. In other embodiments, the polyamide resin is completely cured before the fracking operation.

In one aspect, the resin has a glass transition temperature from about −50° C. to about 190° C. In some embodiments, the glass transition temperature is from about −50° C., about −40° C., about −30° C., about −20° C., about −10° C., about 0° C., about 10° C., about 15° C., about 20° C., about 25° C., about 30° C., about 35° C., about 40° C., about 45° C., about 50° C., about 65° C., about 70° C., about 75° C., about 80° C., about 85° C., about 90° C., about 95° C., about 100° C., about 105° C., about 110° C., about 115° C., about 120° C., about 130° C., about 135° C., about 140° C., about 145° C., about 150° C., about 155° C., about 160° C., about 165° C., about 170° C., about 175° C., about 180° C., about 185° C. or about 190° C. In some embodiments, the glass transition temperature is from about −30° C. to about 150° C., or from about 150° C. to about 170° C. In some embodiments, the glass transition temperature is from about 150° C. to about 190° C.

In one aspect, the resin has a melting point in the from about 30° C. to about 200° C. In some embodiments, the melting point is from about 30° C., about 35° C., about 40° C., about 45° C., about 50° C., about 55° C., about 60° C., about 65° C., about 70° C., about 75° C., about 80° C., about 85° C., about 90° C., about 95° C., about 100° C., about 105° C., about 110° C., about 115° C., about 120° C., about 130° C., about 135° C., about 140° C., about 145° C., about 150° C., about 155° C., about 160° C., about 165° C., about 170° C., about 175° C., about 180° C., about 185° C., about 190° C., about 195° C., or about 200° C. In some embodiments, the melting point is from about 60° C. to about 100° C., or from about 100° C. to about 140° C., from about 140° C. to about 180° C., from about 180° C. to about 200° C. In some embodiments, the melting point is from about 100° C. to about 190° C.

The polyamide resin coated proppants of the present technology are believed to confer a number of advantages, both during the coating process and during the fracking process. In general, resins may be classified in their reaction to heat. A "thermoset" resin is a resin that cures or hardens (sets) into a given shape, generally through the application of heat or treatment with a curing agent. "Curing" of the resin is a cross-linking reaction between unreacted functional groups (such as amines) on the resin that imparts rigidity and thermoset character to the resin. In contrast, a "thermoplastic" resin softens when heated, but it does not cure or set. For certain resins, for example, phenolic resins, the thermoplastic resin can be converted to a thermoset resin by curing. Without being bound by theory, it is believed that the polyamide resins coated on the proppants behave as thermoplastic resins as opposed to thermoset resins. One advantage of using a thermoplastic polyamide resin for coating proppants is a more efficient and cost-effective coating process. It is anticipated that the thermoplastic resins will not stick to the mixing equipment as much as uncured phenolic materials, resulting in fewer mixer cleanouts. In addition, it is also hypothesized that when the mixing equipment needs cleaning, thermoplastic resins can be re-melted and easily cleaned out of the coating equipment compared to thermoset resins (for example, phenolic resins). The easier cleaning process results in lower downtimes between batches of coating processes and lower wear and tear on the coating equipment. Without being bound by theory, it is also hypothesized that the polyamide resin coatings of the present invention are believed to require a shorter coating time compared to traditionally used phenolic resins during the proppant coating process.

The polyamide resin of the present invention does not include the use of harmful raw materials such as phenol, formaldehyde and isocyanates. The polyamide resin coatings described in the present technology do not degrade to form formaldehyde. Thus, the presently described resin coatings increase the life of the formation and the equipment, and do not present the dangers that are associated with handling, working, and leaching of phenol, formaldehyde, and/or isocyanates.

The use of the coated proppant has advantageous properties during the hydraulic fracturing process. The resin coating increases the effective compressive strength of the underlying proppant, such as sand, through the toughness of the resin. Upon being encased by the resin coating, the proppant becomes less brittle and has higher shear strength. The coated proppant creates less dust when transported via pneumatic tubing used during the fracking procedure. Even if the proppant fails under pressure and breaks up in to smaller pieces, the resin coating encases the proppant and prevents the fines from becoming free. Even a small amount of loose fines in a proppant bed can significantly reduce the conductivity and thus the productivity of the well.

The present resins provide a tacking mechanism that is sensitive to pressure and that can be activated at a range of temperatures. A tacking mechanism that is more pressure sensitive versus temperature sensitive is known to tack faster and more reliably. Faster tacking reduces production costs. Commonly used phenolic resins employed in resin coated "curable" proppants are introduced into the well, and are followed by an activator that aids hardening and strengthening of the proppant pack. Curing times for phenolic resins are typically about 12 hours, but due to the wide variation in well temperatures, it is typical to hold the pressure for up to 20 hours or longer after introduction of the curing agent to ensure proper curing. Phenolic resins also require very uniform temperatures to create a uniform cured material. Introduction of the phenolic resin curing agents into the well following the proppant results in a non-uniform mixing of the coated proppant with the curing agent. In contrast, the polyamide resin of the present technology is not tacky at ambient conditions allowing storage at room or ambient temperatures without agglomeration, but develops a substantially high bond strength in a fairly short period of time. Pressure in the well during the fracking procedure can be more precisely manipulated by the fluid pumps, thus reducing hold times after introduction of the proppant into the well. This results in the present resins exhibiting faster and more controlled tacking, and a faster completion of the hydraulic fracturing job. A commonly used test for measuring "tack" generated downhole is the Unconfined Compressive Strength test, in which the tested particles are subjected to specified conditions of temperature and pressure for a specific amount of time and the strength of the resultant bond strength between the particles measured. Other methods for evaluating tack or particle-to-particle bond are known to persons of ordinary skill in the art.

In some embodiments, the polyamide resin based proppants of the present technology develop tack/high bond strength in less than about 24 hours, less than about 18 hours, less than about 14 hours, less than about 12 hours, less than about 10 hours, less than about 8 hours, less than about 7 hours, less than about 6 hours, less than about 5 hours, less than about 4 hours, less than about 3 hours, or less than about 2 hours. In some embodiments, the polyamide resin based proppants of the present technology tack at pressures less than about 8000 psi, less than about 7000 psi, less than about 6000 psi, less than about 5000 psi, less than about 4000 psi, less than about 3000 psi, less than about 2000 psi, or at about 1000 psi.

Besides, the coated proppant should exhibit adequate crush resistance as well as provide a strong particle-to-particle bond in order to avoid flowback and fines migration. In turn, the coated proppant should be non-tacky and free-flowing during transport and storage. At temperatures and pressures often encountered in subterranean formations, the coated proppants exhibit latent tackiness leading to the agglomeration of the coated proppants when placed on the formation without the need of an activator. The network of agglomerated proppant prevents particle flow-back and reduces fines migration. The developed coating provides better performance than commercially available coated proppants at temperatures as low as 32° C.

In some embodiments, the present technology provides a polyamide resin coated proppant that is capable of achieving a strong particle to particle bond when placed in a well at temperatures less than about 35° C., less than about 40° C., less than about 45° C., less than about 50° C., less than about 55° C., or less than about 60° C., wherein the coated proppant exceeds the Unconfined Compressive Strength value of a curable phenolic resin or polyurethane coated proppant coated in the same weight percent as the polyamide resin coated proppant. In some embodiments, the Unconfined Compressive Strength of the polyamide coated proppant is increased by at least about 50%, at least about 60%, at least about 70%, at least about 80%, at least about 90%, or at least about 100% compared to the Unconfined Compressive Strength of a curable phenolic resin or polyurethane coated proppant coated in the same weight percent as the polyamide resin coated proppant. In specific embodiments, the Unconfined Compressive Strength of the polyamide coated proppant is increased by at least about 2 times, at least about 3 times, at least about 4 times, at least about 5 times, or at least about 6 times that of a curable phenolic resin or polyurethane coated proppant coated in the same weight percent as the polyamide resin coated proppant.

In some embodiments, the coated proppant of the present technology provides an Unconfined Compressive Strength value higher than 50 psi, higher than 100 psi, higher than about 200 psi, or at a range of about 100-350 psi, at low temperatures, wherein the proppant is coated with polyamide resin. The Unconfined Compressive Strength is measured using standard methods known to a person of ordinary skill in the art. In additional or alternative embodiments, the coated proppant of the present technology achieves an Unconfined Compressive Strength of at least 50 psi after about 4 hours at about 1000 psi, at about 5000 psi or about 8000 psi and at low temperatures, wherein the proppant is coated with polyamide resin. In some embodiments, the temperature is lower than about 60° C., lower than about 50° C., lower than about 45° C., lower than about 40° C., lower than about 35° C., lower than about 32° C., or about 32° C. In some embodiments, the polyamide-resin based proppants of the present technology achieve the Unconfined Compressive Strength after maintaining the proppant at a specified temperature and pressure in less than about 24 hours, less than about 18 hours, less than about 14 hours, less than about 12 hours, less than about 10 hours, less than about 8 hours, less than about 7 hours, less than about 6 hours, less than about 5 hours, less than about 4 hours, less than about 3 hours, or less than about 2 hours.

Any type of material is suitable as a proppant, so long as the particle has sufficient strength to withstand the stresses, such as elevated temperature and pressure, often encountered in oil and gas recovery applications. In some embodiments, the particle of the coated proppant is a sand, a naturally occurring mineral fiber, a ceramic, a bauxite, a glass, a metal bead, a walnut hull, other nut shells, a composite particle, and the like. For instance, the sand can be graded sand. A ceramic can include both porous and non-porous ceramic materials, while a bauxite can include sintered bauxite materials. Composite particles are an agglomeration of smaller, fine particles held together by a binder, and such composite particles can be the particulate material in the present technology. Compositions containing coated proppants can employ mixtures or combinations of more than one type of particle, for instance, both a sand and a ceramic can be coated and then mixed to form a composition of coated proppants. Alternatively, a sand and a ceramic may be mixed and then coated to form a composition of coated proppants. It is contemplated that any particulate material suitable for use in proppant applications can be used in the present technology, regardless of the specific gravity of the particle, although it can be beneficial in certain applications to have a lower specific gravity to increase the distance that the proppants can be carried into a formation prior to settling.

In some embodiments, the particle is either a porous ceramic or porous polymer particle. Such particles are described in, for example, U.S. Pat. Nos. 7,426,961 and 7,713,918, the disclosures of which are incorporated herein by reference in their entirety. These porous ceramic or porous polymer materials can be of natural origin or can be produced synthetically.

In some embodiments, the proppant includes a mixture of two or more different materials. For example, the proppant can include sand and ceramic beads at a ratio of from about 1:99 to about 99:1. In some embodiments, the proppant can include sand and ceramic beads at a ratio of about 90:10, about 80:20, about 70:30, about 60:40, about 50:50, about 40:60, about 30:70, about 20:80, or about 10:90. In some embodiments, part of the proppant is coated with the resin. For example, about 5%, about 10%, about 15%, about 20%, about 25%, about 30%, about 35%, about 40%, about 45%, about 50%, about 55%, about 60%, about 65%, about 70%, about 75%, or about 80% of the proppant is coated with the resin. In particular embodiments, the proppant includes about 85% raw (uncoated) sand, about 10% resin coated sand, and about 5% uncoated ceramic beads. All of the ratios and percentages indicated are by weight.

In one aspect, the weight percent of the resin coating based on the weight of the uncoated proppant is from about 0.5% to about 8% by weight of the particle. In some embodiments, that the weight percent can be about 1%, about 1.5%, about 2%, about 2.5%, about 3%, about 3.5%, about 4%, about 4.5%, about 5%, about 5.5%, about 6%, about 6.5%, about 7%, about 7.5%, or about 8%. In some embodiments, the weight percent can be within any range from about 1% to about 8%, from about 2% to about 7%, from about 3% to about 6%, from about 4% to about 6%, from about 2% to about 8%, or from about 1% to about 5%. In particular embodiments, the weight percent is about 0.5% to about 2%.

The particle size of the particle used in the coated proppant of the present technology generally falls within a range from about 100 microns to about 3000 microns (about 3 mm). In some embodiments, the particle size is from about 125 microns to about 2500 microns, from about 150 microns to about 2000 microns, or from about 175 microns to about 1500 microns. In some embodiments, the particle of the coated proppant of the present technology has a particle size that falls within a narrower range of about 200 to about 1000 microns, for example, about 250 to about 800 microns, or from about 300 to about 700 microns.

In some embodiments, the particles generally have a mesh size from about 8 to about 100, based on the U.S. Standard Sieve Series. For example, in a distribution of such particles which can be added to a treating fluid for use in a subterranean formation, at least about 90% by weight of the particles have a particle size falling within the range from about 8 to about 100 mesh. In accordance with another aspect of the present technology, at least about 95% by weight of the particles in a coated proppant composition have a size within the range from about 8 to about 100 mesh. Further, 90% by weight or more (e.g., 95% or more) of the particles in a coated proppant composition can have a size within the 20 to 40 mesh range in another aspect of this technology.

In some embodiments, the particle in the coated proppant has a size in the range from about 8 to about 140 mesh, from 10 to about 120 mesh, from about 10 to about 100 mesh, or from about 14 to about 80 mesh. In some embodiments, the particle is in a range from about 18 to about 60 mesh, or from about 20 mesh to about 40 mesh. In some embodiments, there is less than about 10% by weight, for example, 5% by weight of less, of particles in a coated proppant composition having a size of less than about 20 mesh or greater than about 50 mesh.

Methods of making coated proppants of the present technology are also provided. In some embodiments, the resin coating is applied onto a particle to obtain the coated proppant. For instance, the resin coating can be applied onto the particle using a warm or hot coat process in which the particles are first heated to a temperature above the melting point of the coating resin. The coating resin then is added to the hot particles, and mixed, causing the coating to coat and fuse to the particles, thereby forming the coated proppant. Sufficient time is provided to allow the resin coating to thoroughly coat the particle, while blending or mixing of the particle with the resin coating is employed. For example, the resin coating is mixed with the particle for about 1 to 2 minutes. In some embodiments, the particle is mixed with the resin for up to about 5 minutes, up to about 6 minutes, up to about 7 minutes, up to about 8 minutes, up to about 9 minutes, or up to about 10 minutes. The resultant hot, coated proppants then are quenched to a temperature below the melting or softening point of the resin coating to yield non-tacky, free-flowing solids. The coated proppants can be sieved to the desired particle size distribution. Prior to the addition of the resin to the particle, optionally, the resin coating can be pre-heated to melt the coating by heating the coating material to a temperature in excess of its melting point.

Alternatively, the coating can be dissolved in a suitable solvent, or suspended or emulsified in a suitable solvent, and the resin-containing solvent then can be applied to the particulate. In some embodiments, the solvent may include, but is not limited to, saturated and unsaturated alcohols having 1-24 carbon atoms, ether alcohols having 5-36 carbon atoms, hydrocarbons having 5-50 carbon atoms, ethers and carboxylic acid esters having 10-60 carbon atoms. Illustrative of these are (without limitation) methanol, ethanol, isopropyl alcohol, 1-butanol, 2-butanol, cyclohexanol, 1-hexanol, 2-hexanol, cis-2-hexen-1-ol, α-terpineol, terpene hydrocarbon, toluene, xylene, methyl lactate, ethyl lactate, n-propyl lactate, isopropyl lactate, diethylene glycol methyl ether, dipropylene glycol methyl ether, cyclohexanone, or mixtures thereof. The coating can be, for example, blended or mixed with, or sprayed onto, the particles to be coated. Other methods known to those of skill in the art also can be used, and such methods may vary based on the particular resin coating employed. Once the particle is coated, solvent is removed by suitable means (e.g., drying), resulting in free-flowing, coated proppants.

In some embodiments, the method of preparing a coated proppant includes contacting the proppant with a resin aqueous emulsion or dispersion.

In one aspect, the resin is uncured after coating the proppant. In other embodiments, the resin has unreacted amine groups which are cured by crosslinking with an appropriate crosslinking agent. Unreacted groups are typically indicated by their acid and amine values. In some embodiments, the polyamide resins of the present technology have low acid or amine values, for example, less than 15 mg KOH/g of resin, or less than 12 mg KOH/g of resin, or less than 10 mg KOH/g of resin. In other embodiments, the polyamide resins of the present technology have an amine value of about 50-100 mg KOH/g of resin. In further embodiments, the polyamide resins of the present technology have an amine value of greater than about 50 mg KOH/g of resin, greater than about 100 mg KOH/g of resin. Multifunctional materials might be employed in order to react with the polyamide coating so as to increase the hardness of the coating. Examples of crosslinking agents include, but are not limited to, aldehydes, dihalides, polyacidanhydrides, epoxy, functional silanes, polyfunctional monomers or polymers containing two or more acrylic groups among others. The polyfunctional acrylics include (but not limited to) pentaerythritoltriacrylate, trimethylolpropane triacrylate, pentaerythritol tetraacrylate, 1,6-hexanediol diacrylate and the like. Without being bound by theory, it is hypothesized that the acrylic functional group undergoes a Michael reaction with the amine group, thereby curing any unreacted amine groups in the resin.

In some embodiments, the multifunctional curing agent might be added during the coating procedure. In another embodiment, the multifunctional material might be injected with the fracking fluid. The multifunctional material may be mixed with the polyamide resin in an amount from about 0.5 wt % to about 40 wt %.

In one aspect, the coating formulation to coat the resin on to the proppant includes suitable additives. Suitable additives include, but are not limited to, silane coupling agents, plasticizers, fillers, viscosity modifier, top-coatings, antistatic agents, anticaking agents, wetting agents or combinations thereof. Additives such as silanes can be employed to improve the affinity of the coating resin for the surface of the proppant. Functional silanes such as amino-silanes, epoxyaryl- or vinyl silanes are commercially available. In some embodiments, the coating formulation includes a viscosity modifier to facilitate easy, efficient, and uniform coating of the proppant. In some embodiments, the plasticizer, the viscosity modifier, or combinations thereof, are cross-linked to each other or to the polyamide resin, individually or together. In some embodiments, the coating formulation includes corrosion inhibitors.

In certain embodiments, the coating of the present technology may be applied as an outer layer over a previously coated proppant. The coated proppant includes, but are not limited to, phenolic resins, polyurethane resins, epoxy resins, polyurea resins. Without being limited by theory, it is hypothesized that the outer layer enhances the bonding ability of the underlying coating.

A "tackifying agent" refers to a material that, when coated onto a particle exhibits a sticky or tacky character. In one aspect, it is hypothesized that the coated proppant of the present technology tacks at higher pressure without the use of a tackifying agent. Thus, in one aspect, the coated proppant is not coated with a tackifying agent.

In some embodiments, the coated proppant tacks strongly without an activator at temperatures of about 32° C., and at pressures of greater than 1,000 psi. In additional or alternative embodiments, the coated proppant of the present technology tacks strongly without an activator in less than about 8 hours, in less than about 6 hours, in less than about 5 hours, in less than about 4 hours, or in less than about 3 hours. As noted above, strength of the tack can be measured by the Unconfined Compressive Strength. In some embodiments, the coated proppant of the present technology exhibits an Unconfined Compressive Strength value higher than 50 psi, higher than 100 psi, higher than about 200 psi, or at a range of about 100-350 psi. Without being bound by theory, it is hypothesized that the thermoplastic nature of the polyamide resin results in agglomeration of the proppant. In some embodiments, the proppant also includes a tackifying agent. A proppant coated with a tackifying agent tends to form clusters or aggregates under conditions of high temperature and pressure, such as those that exist within a fracture. Without being bound by theory, it is understood that proppant particles coated with a tackifying agent enhances agglomeration and prevents migration of the proppant particulates after they are placed in the fracture.

In one aspect, the present technology includes a fracking fluid that includes a coated proppant as described herein. In some embodiments, the fracking fluid may include water.

In one aspect, the fracking fluid does not include a tackifying agent. In embodiments where the fracking fluid does not include a tackifying agent, the resin tacks together in the subterranean formation at an adhesion force sufficient that during the hydraulic fracturing operation, the coated proppant and other proppants used remain deep in the subterranean formation, thereby preventing flow-back. In some embodiments, the fracking fluid does not include an activator to accelerate the tacking. In other embodiments, the fracking fluid includes an activator to accelerate the tacking. In certain specific embodiments for formations at temperature ranges of 20° C. to 250° C., an activator is not included. In some embodiments, the fracking fluid includes a tackifying agent.

In some embodiments, the main body of the coating provides additional strength to the proppant at temperatures of 20° C. to 250° C., and the top coat provides the adhesive force between the different proppant particles.

The coated proppant should exhibit adequate crush resistance and conductivity as well as provide a strong particle-to-particle bond in order to avoid flowback and fines migration. In turn, the coated proppant should be non-tacky and free-flowing during transport and storage. At elevated temperatures and pressures often encountered in subterranean formations, the coated proppants exhibit latent tackiness leading to the agglomeration of the coated proppants when placed on the formation without the need of an activator. The network of agglomerated proppant prevents particle flowback and reduces fines migration. The developed coating provides better performance than commercially available coated proppants at temperatures as low as 32° C.

In some embodiments, the fracking fluid is free of formaldehyde. In additional or alternative embodiments, the fracking fluid is free of phenol.

In some embodiments, the fracking fluid includes additives that can serve as corrosion inhibitors, scale inhibitors, or serve other benefits to maximize flow out of the formation or minimize damage to equipment that is placed in the formation or equipment that is used to extract the oil and gas from the formation (pumps, etc.). Use of such additives, may reduce the cost of fracking fluids and the cost of fluids that have to be added to the well during oil and gas extraction. Examples of additives in the fracking fluid are acids, such as hydrochloric or acetic acid; salts, such as sodium chloride; friction reducers, such as polyacrylamide; ethylene glycol, which prevents the formation of deposits in the pipe; agents for maintaining fluid viscosity during the temperature increase, such as borate salts; agents for maintaining effectiveness of cross-linkers, such as sodium or potassium carbonates; bactericides, such as glutaraldehyde; viscosity enhancers, such as water soluble gelling agents to increase the viscosity of the fracking fluid to deliver the proppant more efficiently into the formation; corrosion prevention agents, such as citric acid; and viscosity enhancers, such as isopropanol. In some embodiments, combinations of various additives are added to the fracking fluid to achieve the desired properties.

The invention also includes the use of the coated proppants described herein in conjunction with a fracturing liquid to increase the production of petroleum or natural gas. Techniques for fracturing an unconsolidated formation that include injection of consolidating fluids are also well known in the art. See U.S. Pat. No. 6,732,800 the disclosure of which is herein incorporated by reference. Generally, a fluid is injected through the wellbore into the formation at a pressure less than the fracturing pressure of the formation. The volume of consolidating fluid to be injected into the formation is a function of the formation pore volume to be treated and the ability of the consolidating fluid to penetrate the formation and can be readily determined by one of ordinary skill in the art. As a guideline, the formation volume to be treated relates to the height of the desired treated zone and the desired depth of penetration, and the depth of penetration is preferably at least about 30 cm radially into the formation. Please note that since the consolidation fluid is injected through the perforations, the treated zone actually stems from the aligned perforations.

Before consolidating the formation, optionally, an acid treatment may be performed by injection of an acidic fluid. The acidic treatment typically may include several stages such as an acid pre-flush, one or more stages of acid injection and an over-flush.

After the perforation and the consolidation, the final step is the fracturing step. Although a resin treatment alone may have been sufficient in preventing early sand production the resin reduces the permeability of the formation around the wellbore. The primary purpose of the fracture treatment is to connect the wellbore to the formation and in doing so by pass any damage and act as a filter allowing the production of hydrocarbons while holding back formation material. The high surface area associated with a fracture makes it a very effective filter, for example, a 13.7 m fracture length with 25 cm height has a surface area of 368 $m^2$, compared to the open hole flow area for a gravel pack of 3.2 $m^2$ with the same zone height.

Techniques for hydraulically fracturing a subterranean formation will be known to persons of ordinary skill in the art, and will involve pumping the fracturing fluid into the borehole and out into the surrounding formation. The fluid pressure is above the minimum in situ rock stress, thus creating or extending fractures in the formation. In order to maintain the fractures formed in the formation after the release of the fluid pressure, the fracturing fluid carries a proppant whose purpose is to prevent the fracturing from closing after pumping has been completed.

The fracturing liquid is not particularly restricted and can be selected from among the fracking liquids known in the specific field. Suitable fracturing liquids are described, for example, in W C Lyons, G J Plisga, *Standard Handbook Of Petroleum And Natural Gas Engineering*, Gulf Professional Publishing (2005). The fracturing liquid can be, for example, water gelled with polymers, an oil-in-water emulsion gelled with polymers, or a water-in-oil emulsion gelled with polymers.

The present technology relates to a method for the production of petroleum or natural gas which comprises the injection of the coated proppant into the fractured stratum with the fracturing liquid, i.e., the injection of a fracturing liquid which contains the coated proppant, into a petroleum- or natural gas-bearing rock layer, and/or its introduction into a fracture in the rock layer bearing petroleum or natural gas. The method is not particularly restricted and can be implemented in the manner known in the specific field.

The present technology, thus generally described, will be understood more readily by reference to the following examples, which are provided by way of illustration and are not intended to be limiting of the present invention.

EXAMPLES

A commercially available polyamide, Flex-Rez 1074CS (Color Gardner 7, Acid Value 3.33, Amine Value 1.07, Softening Point (MDSP) 110° C., Brookfield viscosity (160° C.) 2686 cps) was coated on sand. The resin employed for the coating was a dimer fatty acid based polyamide. Coating was performed by using one of two methods:

Method 1:
Proppant material (sand) was heated until it equilibrates at the melting temperature of the resin (e.g. 110° C. for the Flex-Rez). The dimer fatty acid based polyamide is slowly added to the sand. The sand is slowly cooled until the coating hardens.

Method 2:
Coating (1 g) and isopropanol (4 g) (alternatively, toluene may be used) were mixed together. The sand is heated until it equilibrates at the boiling point of the solvent (e.g. 60° C. for isopropanol). The coating solution is slowly added to the sand. The coated sand is slowly cooled until all the solvent evaporates.

In some batches, a silane coupling agent was added to the sand prior to addition of the coating composition containing the resin. In addition, a curing agent can be added after the addition of the polyamide resin to further increase crosslinking.

The coating was performed successfully, as analyzed by means of FTIR Spectroscopy, SEM images, Thermogravimetric analysis, Photoacoustic FTIR, ATR. The coating thickness was determined.

Example 2

A variety of polyamide resins were developed and tested in the laboratory for different properties. Synthesis is carried on as follows: a mixture of dimer fatty acid and other acids is loaded into a glass reactor equipped with a reflux condenser. An adequate solvent may be employed if required and distilled when the reaction is completed. The mixture is heated to 50-100° C. and the amine mixture is slowly added in such a speed that avoids overshooting. Once finished, the reactor is closed and kept at around 100-180° C. for one hour under reflux. The mixture is then heated up to 120-200° C. After one hour, reflux is removed and the mixture is heated up to top temperature (200-280° C., product dependent) to promote the endothermic dehydration and formation of the polymer by melt polycondensation. Acid value and amine value are measured until the desired values is obtained. Eventually, some of the acids and/or amines of the composition might be added later during the heating step. The composition of the resins employed and their relevant properties are shown in the Table below:

| Composition | Batch | | | | | | | |
| --- | --- | --- | --- | --- | --- | --- | --- | --- |
| | A | B | C | D | E | F | G | H |
| Oleic acid | x | x | x | x | x | x | x | x |
| Dimer fatty acid | x | x | x | x | x | x | x | x |
| Trimer fatty acid | | | x | x | x | x | x | x |
| Succinic acid | x | | | | | | | |
| Trimellitic anhydride | | | x | | | | | |
| Glutamic acid | | x | | | | | | |
| Sebacic acid | | | | | | x | | |
| Itaconic acid | | | | | | | | x |
| Isophoronediamine | | | | x | | x | x | x |

The polyamides having compositions A-H exhibit softening points in the range of from about 103° C. to about 145° C.; acid values of from about 1.5 to about 12; amine values of from about 4 to about 16; and molecular weights of from about 4,500 Da to about 14,000 Da.

Example 3

Figure 1:
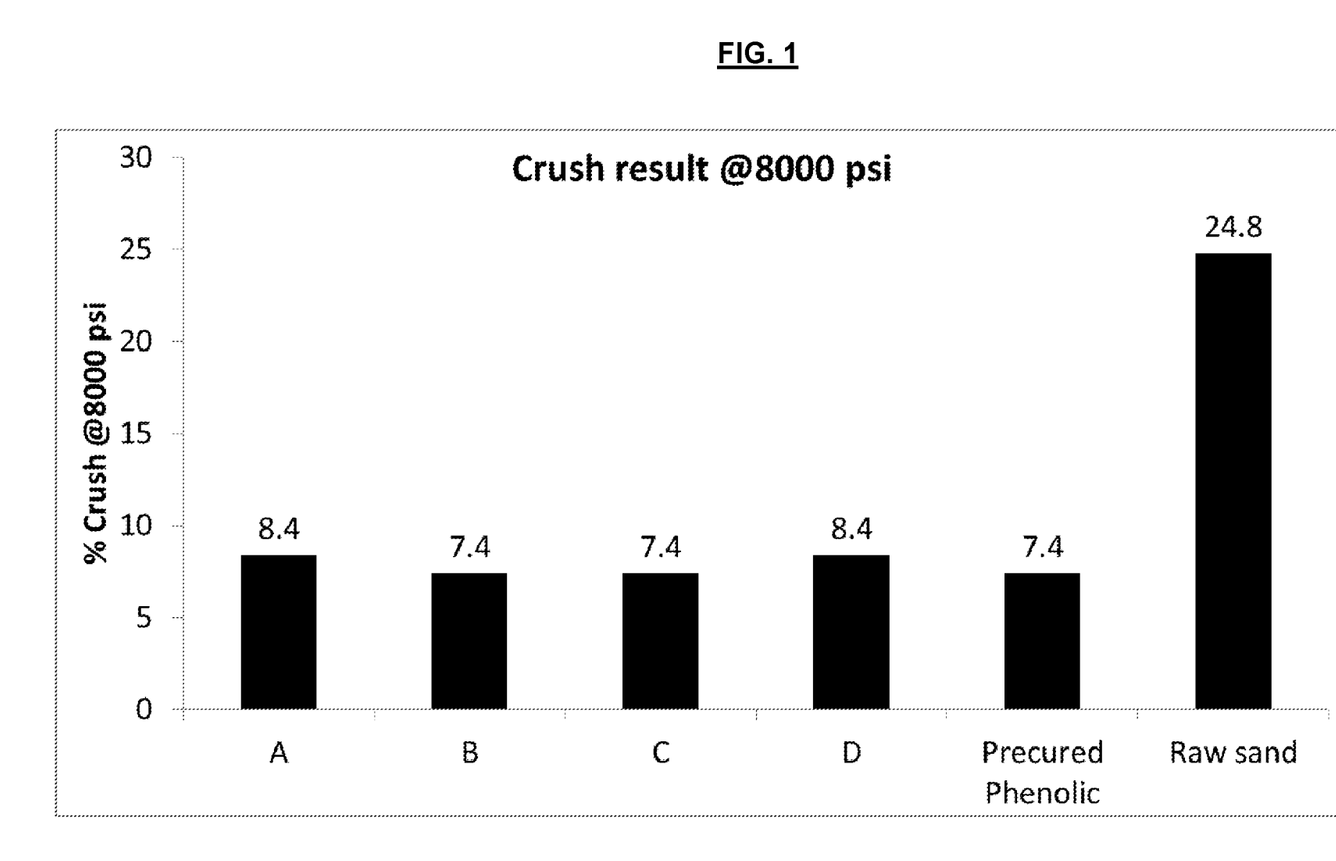
FIG. 1 illustrates the crush resistance at 8000 psi of proppants coated with several resins as exemplified in Example 3.
Figure 2:
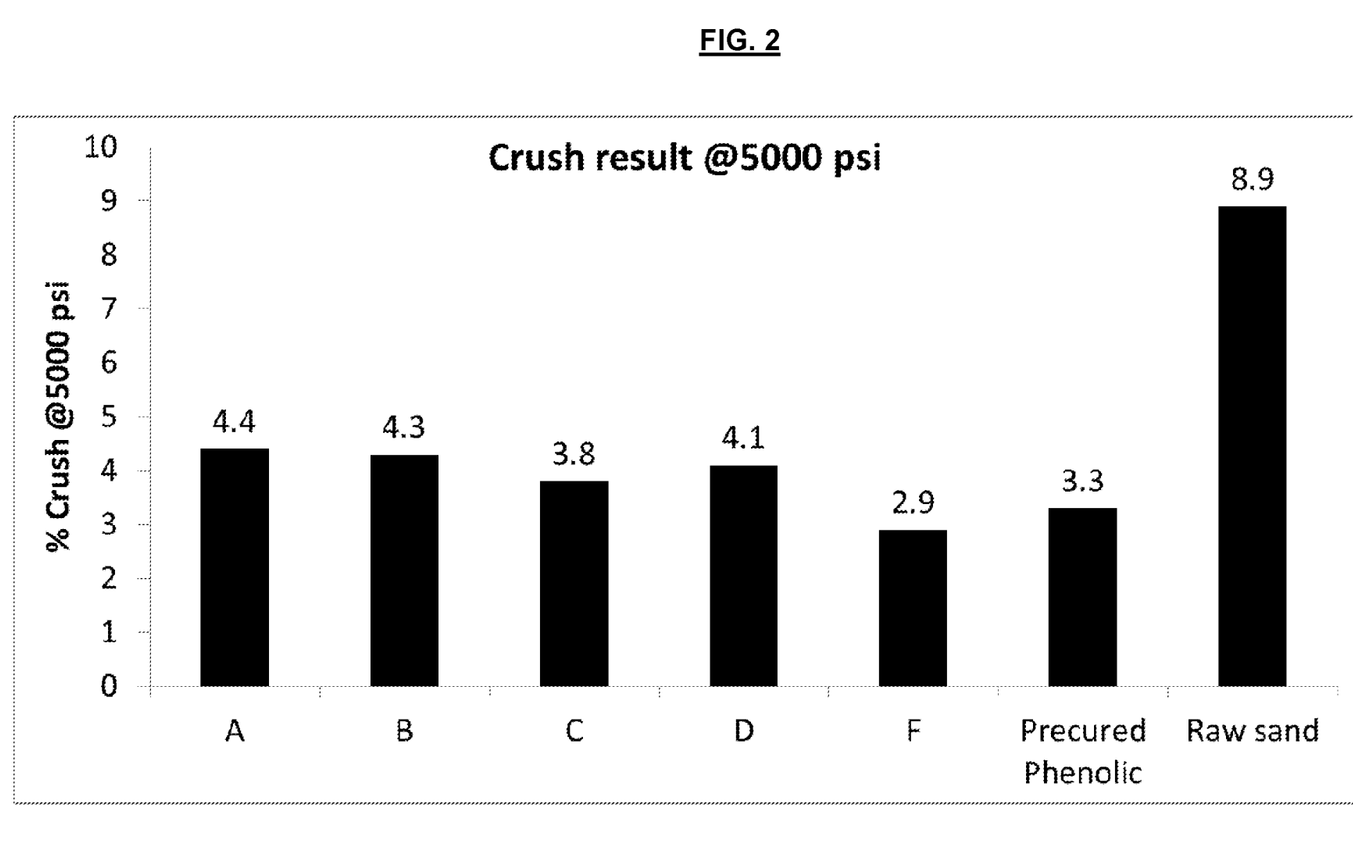
FIG. 2 illustrates the crush resistance at 5000 psi of proppants coated with several resins, as exemplified in Example 3.

Coated proppants of the present disclosure are prepared and characterized as described herein. The graphs in FIGS. 1 and 2 show the Crush Resistance results of four samples coated with the polyamides (labeled A, B, C, and D) at 5000 and 8000 psi, compared to phenolic pre-cured coated sand and raw sand. The test procedure described in "Measurements of Properties of Proppants used in Hydraulic Fracturing and Gravel-packing Operations, ANSI/API recommended practice 19 C. ISO 13503-2:2006" was followed to conduct the tests. All the coated samples show better performance than the uncoated sand. In turn, all the polyamides coated sand showed similar values to the reference sand coated with phenolic resin. Despite the thermoplastic characteristics, the developed polyamides provide the required strength to withstand the pressures encountered in hydraulic fracturing jobs in low temperature wells.

Figure 3:
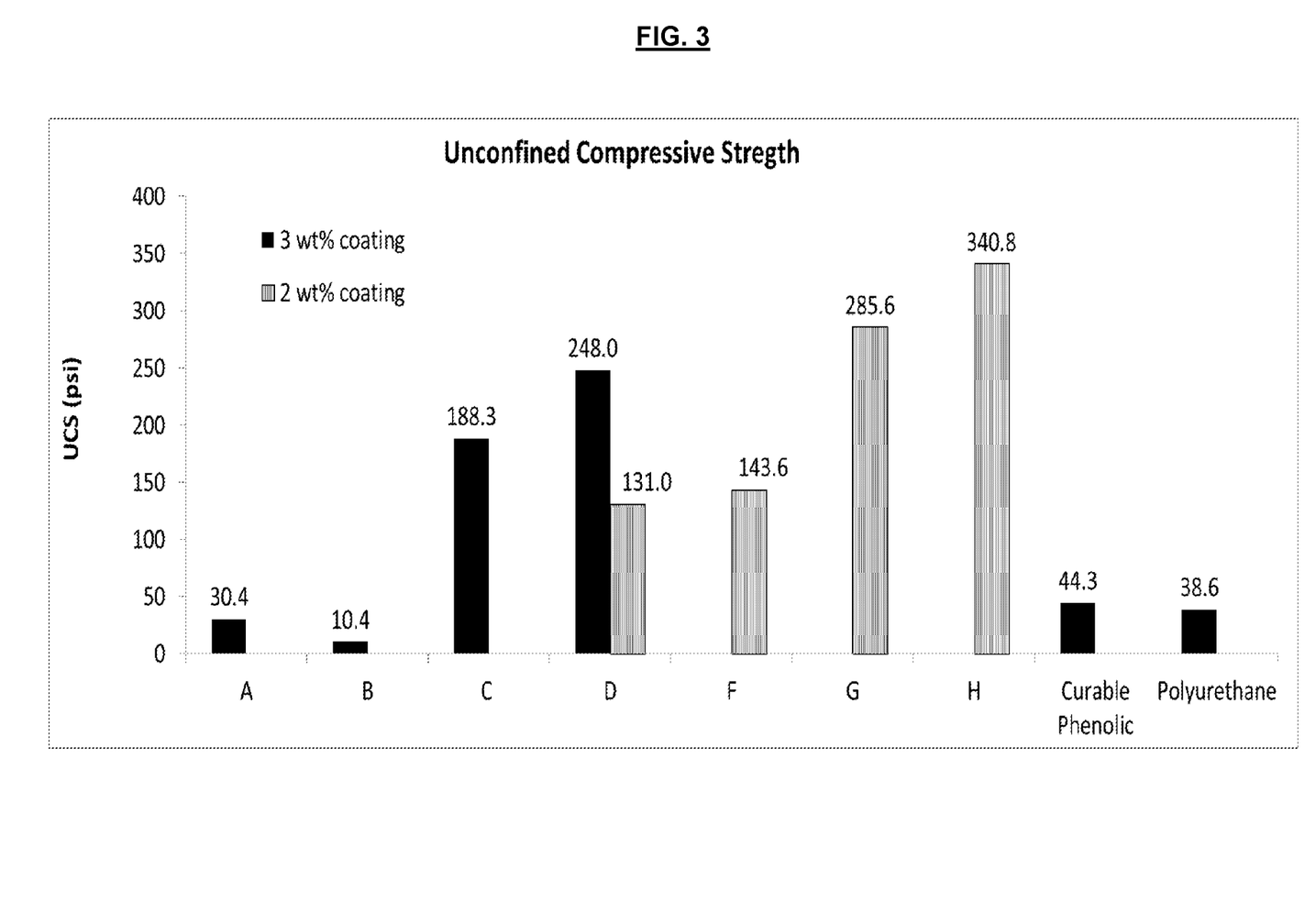
FIG. 3 illustrates the Unconfined Compressive Strength results at 32° C. of proppants coated with several resins, as exemplified in Example 3.

The FIG. 3 shows the Unconfined Compressive Strength (UCS) of the developed polyamides (labeled A, B, C, D, F, G, H) in comparison to two commercial samples, a curable phenolic coated sand and a polyurethane coated sand. The evaluation of the UCS was conducted at 32° C. and at two different coating levels, 3 wt % and 2 wt %, by means of the following test procedure. The tested proppants were contacted with a KCl solution. If required, activator was also added. The solution was mixed with the proppant and the mixture was poured in a cylindrical cell of known dimensions. The air bubbles were eliminated in order to insure a good grain-to-grain contact. The cell was pressurized to 1000 psi and it was placed in an oven at the test temperature for an specified time, generally 24 hours. However, shorter times may be employed when desired. Then the pressure was released and the sample plug was well dried. The dried cured sample was subjected to increasing pressure until stress failure.

This test allows a comparison of the particle to particle bond strength of coated sand. At the temperature of the tests, it can be seen in the FIG. 3 that whereas the commercial samples presented relatively low values of UCS (44.3 psi for a curable phenolic and 38.6 psi for a polyurethane coated sand), some of the developed polyamides showed high bond strength (188.3 psi for polyamide C and 248.0 psi for polyamide D at 3 wt % coating). In turn, some of the developed polyamides presented significantly higher UCS value even at lower coating level (2 wt %, samples D, F, G and H). These results indicate that the polyamide coated sand provides strong bonding capability that would consolidate the proppant or be effective in controlling flowback. The developed resins show outstanding performance at low temperature compared to commercially available coated sand. In addition, the polyamide coated sand does not require an activator to develop the desired particle to particle bond, leading to time savings.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

Para. A. A composition comprising:
a particle; and
a coating on the particle, the coating comprising a polyamide resin;
wherein the composition is a proppant.

Para. B. The composition of Para. A, wherein the particle is a sand, a naturally occurring mineral fiber, a ceramic, a bauxite, a glass, a metal bead, a walnut hull, nut shells, or a composite particle.

Para. C. The composition of any of Paras. A-B, wherein the particle is a porous ceramic or porous polymer particle.

Para. D. The composition of any of Paras. A-C, wherein the particle has a size from about 8 mesh to about 100 mesh.

Para. E. The composition of any of Paras. A-D, wherein the polyamide resin comprises the polymerization product of a dicarboxylic acid and a diamine.

Para. F. The composition of Para. E, wherein the dicarboxylic acid is a dimer fatty acid.

Para. G. The composition of Para. E, wherein the dicarboxylic acid comprises dimerized rosin, glutaric acid, maleic acid, itaconic acid, succinic acid, adipic acid, pimelic acid, glutamic acid, suberic acid, or sebacic acid.

Para. H. The composition of Para. E, wherein the dicarboxylic acid is an aromatic or cyclic aliphatic (alicyclic) acid.

Para. I. The composition of Para H, wherein the aromatic or cyclic aliphatic (alicyclic) carboxylic acid is 1,4-cyclohexane diacarboxylic acid, phthalic acid, isophtalic acid, terephthalic acid, or diphenic acid (biphenyl-2,2-dicarboxylic acid).

Para. J. The composition of Para. E, wherein the dicarboxylic acid is a dicarboxylic acid precursor.

Para. K. The composition of Para J., wherein the dicarboxylic acid precursor comprises acyl halide, ester, and anhydrides such as dimethyl 1,4-cyclohexanedicarboxylate, dimethyl terephthalate, succinic anhydride, trimellitic anhydride, phthalic anhydride, or pyromellitic anhydride.

Para. L. The composition of any of Paras. A-L, wherein the polyamide resin comprises the polymerization product of multifunctional monomers.

Para. M. The composition of Paras. A-L, wherein the polyamide comprises a multifunctional carboxylic acid.

Para. N. The composition of Para. M, wherein the multifunctional carboxylic acid is a trimer fatty acid.

Para. O. The composition of any of Paras. A-N, wherein the diamine comprises ethylene diamine, hexamethylenediamine, 1,3-diaminopropane, 1,4-diaminobutane or amine terminated glygols.

Para. P. The composition of any of Paras. A-O, wherein the diamine comprises piperazine m-xylenediamine or isophoronediamine.

Para. Q. The composition of any of Paras. A-P, wherein the polyamide resin comprises a polyamine.

Para. R. The composition of Para. Q, wherein the polyamine is diethylenetriamine or triethylenetetramine.

Para. S. A coated proppant of any of Paras. A-R, comprising a coating comprising a polyamide resin, wherein the coated proppant is capable of strong particle to particle bond when placed in a well at temperatures less than about 35° C., and wherein said coated proppant exceeds by at least about 50% the Unconfined Compressive Strength value of a curable phenolic resin or polyurethane coated proppant coated in the same weight percent as the coated proppant.

Para. T. A fracking fluid, comprising water, and a composition comprising:
a particle; and
a coating on the particle, the coating comprising a polyamide resin;
wherein the composition is a proppant.

Para. U. The fracking fluid of Para. T, wherein the particle is a sand, a naturally occurring mineral fiber, a ceramic, a bauxite, a glass, a metal bead, a walnut hull, nut shells, or a composite particle.

Para. V. The fracking fluid of any of Paras. T or U, wherein the particle is a porous ceramic or porous polymer particle.

Para. W. The fracking fluid of any of Paras. T-V, wherein the particle has a size from about 8 mesh to about 140 mesh.

Para. X. The fracking fluid of any of Paras. T-W, wherein the polyamide resin comprises the polymerization product of a dicarboxylic acid and a diamine.

Para. Y. The fracking fluid of Para. X, wherein the dicarboxylic acid is a dimer fatty acid.

Para. Z. The fracking fluid of Para. X, wherein the dicarboxylic acid comprises dimerized rosin, glutaric acid, maleic acid, itaconic acid, succinic acid, adipic acid, pimelic acid, glutamic acid, suberic acid, or sebacic acid.

Para. AA. The fracking fluid of Para. X, wherein the dicarboxylic acid is an aromatic or cyclic aliphatic (alicyclic) acid.

Para. BB. The fracking fluid of Para. AA, wherein the aromatic or cyclic aliphatic (alicyclic) carboxylic acid is 1,4-cyclohexane dicarboxylic acid, phthalic acid, isophthalic acid, terephthalic acid, or diphenic acid (biphenyl-2,2-dicarboxylic acid).

Para. CC. The fracking fluid of Paras. X-BB, wherein the dicarboxylic acid is a dicarboxylic acid precursor.

Para. DD. The fracking fluid of Para. CC, wherein the dicarboxylic acid precursor comprises acyl halide, ester, or anhydrides such as dimethyl 1,4-cyclohexanedicarboxylate, dimethyl terephthalate, succinic anhydride, trimellitic anhydride, phthalic anhydride, or pyromellitic anhydride.

Para. EE. The fracking fluid of any of Paras. X-DD, wherein the polyamide resin comprises the polymerization product of multifunctional monomers.

Para. FF. The composition of Paras. X-EE, wherein the polyamide comprises a multi-functional carboxylic acid.

Para. GG. The composition of Para. FF, wherein the multi-functional carboxylic acid is trimer fatty acid.

Para. HH. The fracking fluid of any of Paras. T-GG, wherein the polyamide resin comprises a diamine selected from the group consisting of ethylene diamine, hexamethylenediamine, 1,3-diaminopropane, 1,4-diaminobutane, and amine terminated glycols.

Para. II. The fracking fluid of any of Paras. T-HH, wherein the polyamide resin comprises a diamine selected from the group consisting of piperazine, m-xylenediamine and isophoronediamine.

Para. JJ. The fracking fluid of any of Paras. T-II, wherein the polyamide resin comprises a polyamine.

Para. KK. The fracking fluid of Para. JJ, wherein the polyamine is diethylenetriamine or triethylenetetramine.

Para. LL. The fracking fluid of any of Paras. T-KK, further comprising a component selected from the group consisting of a corrosion inhibitor, a scale inhibitor, and a combination of any two or more thereof.

Para. MM. The fracking fluid of any of Paras. X-LL, which does not include a tackifying agent.

Para. NN. A method of preparing a coated proppant comprising a particle and a coating on the particle, the coating comprising a polyamide resin;
the method comprising contacting the particle with a composition comprising the polyamide resin.

Para. OO. The method of Para. NN, wherein the particle is a sand, a naturally occurring mineral fiber, a ceramic, a bauxite, a glass, a metal bead, a walnut hull, nut shells, or a composite particle.

Para. PP. The method of Paras. NN or OO, wherein the particle is a porous ceramic or porous polymer particle.

Para. QQ. The method of any of Paras. NN-PP, wherein the particle has a size from about 8 mesh to about 100 mesh.

Para. RR. The method of any of Paras. NN-QQ, wherein the polyamide resin comprises the polymerization product of a dicarboxylic acid and a diamine.

Para. SS. The method of Paras. NN-SS, wherein the polyamide resin comprises a dicarboxylic acid which is a dimer fatty acid.

Para. TT. The method of Paras. NN-SS, wherein the dicarboxylic acid comprises dimerized rosin, glutaric acid, maleic acid, itaconic acid, succinic acid, adipic acid, pimelic acid, glutamic acid, suberic acid, or sebacic acid.

Para. UU. The method of Paras. NN-TT, wherein the dicarboxylic acid is an aromatic or cyclic aliphatic (alicyclic) acid.

Para. VV. The method of Para. UU, wherein the aromatic or cyclic aliphatic (alicyclic) carboxylic acid is 1,4-cyclohexane dicarboxylic acid, phthalic acid, isophthalic acid, terephthalic acid, or diphenic acid (biphenyl-2,2-dicarboxylic acid).

Paras. WW. The method of Paras. NN-VV, wherein the polyamide resin comprises a dicarboxylic acid which is a dicarboxylic acid precursor.

Para. XX. The method of Para. WW, wherein the dicarboxylic acid precursor comprises acyl halide, ester, and anhydrides such as dimethyl 1,4-cyclohexanedicarboxylate, dimethyl terephthalate, succinic anhydride, trimellitic anhydride, phthalic anhydride, or pyromellitic anhydride.

Para. YY. The composition of Paras. NN-YY, wherein the polyamide resin comprises a multi-functional carboxylic acid.

Para. ZZ. The composition of Para. YY, wherein the multi-functional carboxylic acid is trimer fatty acid.

Para. AAA. The method of any of Paras. NN-ZZ, wherein the polyamide resin comprises the polymerization product of multifunctional monomers.

Para. BBB. The method of any of Paras. NN-AAA, wherein the diamine comprises ethylene diamine, hexamethylenediamine, 1,3-diaminopropane, 1,4-diaminobutane, or amine terminated glycols.

Para. CCC. The method of any of Paras. NN-BBB, wherein the diamine comprises piperazine, m-xylenediamine or isophoronediamine.

Para. DDD. The method of any of Paras. NN-CCC, wherein the polyamide resin comprises a polyamine.

Para. EEE. The method of Para. DDD, wherein the polyamine is diethylenetriamine or triethylenetetramine.

Para. FFF. The method of any of Paras. NN-EEE, wherein the coated proppant is capable of strong particle to particle bond when placed in a well at temperatures below about 35° C., wherein said coated proppant exceeds an Unconfined Compressive Strength value of a curable phenolic resin or polyurethane coated proppant coated in the same weight percent as the polyamide resin coated proppant, and wherein the Unconfined Compressive Strength of the polyamide coated proppant by at least about 50%.

Para. GGG. The method of any of Paras. NN-FFF, wherein the particle, or the composition, or both, are heated to a temperature above the melting point of the resin to yield a hot coated proppant.

Para. HHH. The method of Para. GGG, further comprising cooling the hot coated proppant to a temperature below the melting point of the resin after the heating to a temperature above the melting point of the resin.

Para. III. The method of any of Para. NN-HHH, wherein the composition comprising the polyamide resin further comprises a solvent comprising saturated and unsaturated alcohols having 1-24 carbon atoms, ether alcohols having 5-36 carbon atoms, hydrocarbons having 5-50 carbon atoms, ethers or carboxylic acid esters having 10-60 carbon atoms.

Para. JJJ. The method of any of Paras. NN-III, wherein the composition comprising the polyamide resin further comprises a solvent selected from the group consisting of methanol, ethanol, isopropyl alcohol, 1-butanol, 2-butanol, cyclohexanol, 1-hexanol, 2-hexanol, cis-2-hexen-1-ol, α-terpineol, terpene hydrocarbon, toluene, xylene, methyl lactate, ethyl lactate, n-propyl lactate, isopropyl lactate; diethylene glycol methyl ether, dipropylene glycol methyl ether, cyclohexanone, and mixtures thereof.

Para. KKK. The method of any of Para. NN-JJJ, wherein the composition further comprises a silane coupling agent, a plasticizer, a viscosity modifier, or a top coating.

Para. LLL. The method any of any of Paras. NN-KKK, wherein the composition does not include a tackifying agent.

Para. MMM. The method of any of any of Paras. NN-LLL, further comprising treating the coated proppant with a curing agent.

Para. NNN. The method of Para. MMM, wherein the curing agent comprises an acrylic functional group.

Para. OOO. A proppant prepared by the method of any of Paras. NN-NNN.

Para. PPP. A proppant of any of Paras. A-S, wherein the coated proppant is capable of strong particle to particle bond when placed in a well at temperatures below about 35° C., wherein said coated proppant exceed the UCS value of a curable phenolic resin or polyurethane coated proppant coated in the same weight percent as the polyamide resin coated proppant, and wherein the Unconfined Compressive Strength of the polyamide coated proppant by at least about 50%.

Para. QQQ. A proppant of any of Paras. A-S, which tacks strongly without an activator in less than about 4 hours at temperatures of about 32° C., and at pressures of greater than 1,000 psi.

Para. RRR. The proppant of any of Paras. A-QQQ, wherein the weight percent of the resin coating based on the weight of the uncoated proppant is from about 0.5% to about 8% by weight of the particle.

Para. SSS. The proppant of any of Paras. A-RRR, wherein the weight percent of the resin coating based on the weight of the uncoated proppant is from about 1% to about 3% by weight of the particle.

Para. TTT. The proppant of any of Paras. A-LLL, wherein the polyamide resin has reactive functional groups that can react with an appropriate curing agent.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A composition comprising a plurality of coated proppants, wherein each of the coated proppants comprises a particle coated with a polyamide resin, wherein the polyamide resin comprises the polymerization product of a dicarboxylic acid and a diamine;
wherein:
the composition is a non-tacky coated proppant during transport and storage;
the composition is free of a tackifying agent;
the dicarboxylic acid is a dimer fatty acid; and
the polyamide resin has a glass transition temperature greater than about 50° C.

2. The composition of claim 1, wherein the particle is a sand, a naturally occurring mineral fiber, a ceramic, a bauxite, a glass, a metal bead, a walnut hull, nut shells, or a composite particle.

3. The composition of claim 1, wherein the particle is a porous ceramic or porous polymer particle.

4. The composition of claim 1, wherein the particle has a size from about 8 mesh to about 100 mesh.

5. The composition of claim 1, wherein the dicarboxylic acid comprises dimerized rosin, glutaric acid, maleic acid, itaconic acid, succinic acid, adipic acid, pimelic acid, glutamic acid, suberic acid, or sebacic acid.

6. The composition of claim 1, wherein the polyamide resin comprises a multifunctional carboxylic acid.

7. The composition of claim 6, wherein the multi-functional carboxylic acid is a trimer fatty acid.

8. The composition of claim 1, wherein the diamine is selected from the group consisting of ethylene diamine, hexamethylenediamine, 1,3-diaminopropane, 1,4-diaminobutane and amine terminated glygols.

9. A fracking fluid, comprising water, and the composition of claim 1.

10. The fracking fluid of claim 9, wherein the polyamide resin comprises the polymerization product of a dicarboxylic acid and a diamine.

11. The composition of claim 1, wherein the weight percent of the polyamide resin coating based on the weight of an uncoated proppant is from about 0.5% to about 8% by weight of the particle.

12. The composition of claim 1, wherein the weight percent of the polyamide resin coating based on the weight of an uncoated proppant is from about 1% to about 3% by weight of the particle.

13. The composition of claim 1, wherein the polyamide resin has unreacted functional groups which are cured by crosslinking with an appropriate crosslinking agent.

14. The composition of claim 1, wherein the dicarboxylic acid is an aromatic or cyclic aliphatic (alicyclic) acid.

15. The composition of claim 1, wherein the aromatic or cyclic aliphatic (alicyclic) carboxylic acid is 1,4-cyclohexane diacarboxylic acid, phthalic acid, isophtalic acid, terephthalic acid, or diphenic acid (biphenyl-2,2-dicarboxylic acid).

16. The composition of claim 1, wherein the diamine comprises m-xylenediamine or isophoronediamine.

17. The composition of claim 1, wherein the polyamide resin comprises the polymerization product of:
    a dicarboxylic acid, a multifunctional carboxylic acid, or a mixture thereof; and
    a diamine selected from the group consisting of m-xylenediamine, isophoronediamine, or a mixture thereof.

18. The composition of claim 14, wherein the diamine comprises isophoronediamine.

19. The composition of claim 1, wherein the composition comprises from 2 wt % to 3 wt % of the coating.

20. The composition of claim 1, wherein the composition exhibits an Unconfined Compressive Strength value that is at least 50% greater than a Unconfined Compressive Strength of a curable phenolic resin or polyurethane coated proppant coated in the same weight percent as the composition.

21. The composition of claim 1, wherein the coated proppant consists of the particle coated with the polyamide resin.

22. The composition of claim 1, wherein the composition comprises a plurality of coated proppants, each coated proppant consisting a single particle coated with the polyamide resin.

* * * * *